No. 770,207.

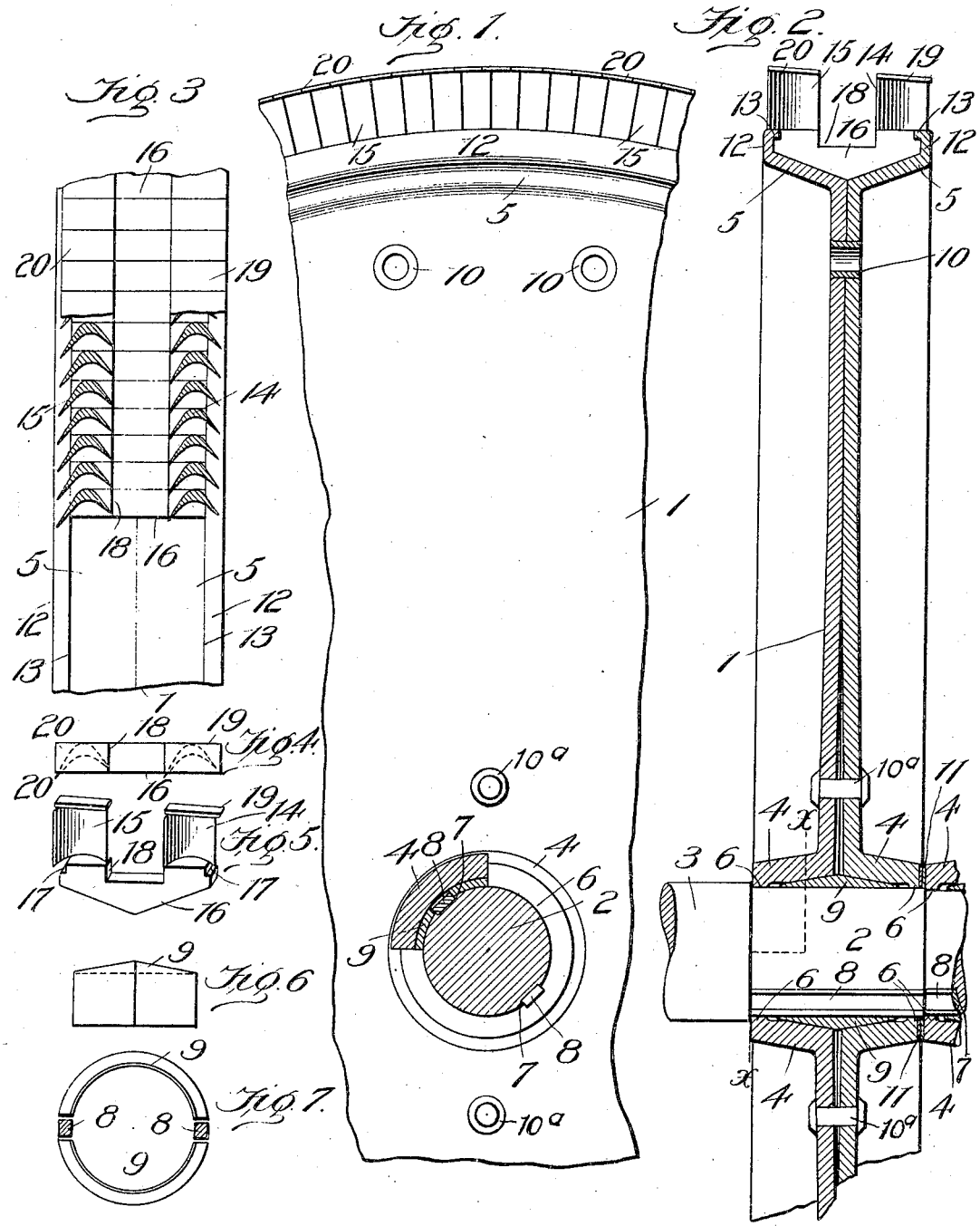

Patented September 13, 1904.

UNITED STATES PATENT OFFICE.

JAMES WILKINSON, OF BIRMINGHAM, ALABAMA, ASSIGNOR TO THE WILKINSON STEAM TURBINE COMPANY, OF BIRMINGHAM, ALABAMA, A CORPORATION OF ALABAMA.

ELASTIC-FLUID TURBINE-WHEEL.

SPECIFICATION forming part of Letters Patent No. 770,207, dated September 13, 1904.

Application filed July 12, 1904. Serial No. 216,267. (No model.)

*To all whom it may concern:*

Be it known that I, JAMES WILKINSON, a citizen of the United States, residing at Birmingham, in the county of Jefferson and State of Alabama, have invented new and useful Improvements in Elastic-Fluid Turbine-Wheels, of which the following is a specification.

My invention relates to bucket-wheels for elastic-fluid turbines, and has for its object to provide a wheel which can be readily assembled, is light, and at the same time possesses the necessary strength and durability, and whose parts are simple in construction and capable of being manufactured at a comparatively small cost.

One object of my invention is to provide an improved means for securing the wheel to the shaft, and to this end I construct the wheel in two parts, each having a hub portion which is adapted to engage a divided cone mounted on the shaft and by a wedging action thereon to lock itself firmly against movement. Feathers engage the hub and cone sections and serve as a positive connection between the wheel and shaft.

Another object of my invention is to simplify the construction of wheels having two peripheral rows of buckets at the same radial distance from the shaft-center. This I effect by mounting two buckets, one from each row, upon a common axially-disposed base-block and securing this block firmly in position by causing the peripheral flanged rim portion of the wheel parts to engage it when they are joined together.

My invention comprises the details of construction and arrangement of parts hereinafter described, and illustrated in the accompanying drawings, in which—

Figure 1 is a partial side elevation of the wheel with the hub part shown partly in section along the line *x x*, Fig. 2. Fig. 2 is a vertical sectional view through Fig. 1. Fig. 3 is a partial plan view of the periphery of the wheel, showing part of the head-blocks of the buckets broken away. Fig. 4 is a top plan view, and Fig. 5 is a detail view in elevation, of one of the double base-blocks provided with two buckets. Fig. 6 is a side elevation of the bearing-cone for the wheel. Fig. 7 is an end view of the two half-sections of the cone with the feathers in position disposed between them.

Similar reference-numerals refer to the same parts throughout.

I have illustrated my improved bucket-wheel 1 mounted upon a reduced portion 2 of the main turbine-shaft 3. The wheel comprises two metallic disks or plates formed with flanged hub portions 4 and peripheral flanged bucket-engaging portions 5. The hub-flanges 4 at their outer ends are provided with portions 6, which engage the shaft 2 and are cut away to permit the insertion of feathers 7 into key-slots 8, which are formed at diametrically opposite points in the shaft 2. These feathers, which are comparatively small in size, serve the purpose of keying the wheel to the shaft. From the portions 6 the hub-flanges on their inner sides toward the shaft taper toward their adjacent edges, thus forming, with the shaft, a recess triangular in cross-section for the reception of the cone 9, which is formed in two halves, as shown in Fig. 7, and slipped on the shaft 2 before the two sections of the wheel are secured together by rivets 10 near their periphery. The cone-sections are disposed between the two feathers 8, as shown in Fig. 7, and leave a slight clearance, so that the wedging action of the hub portions 4 against them will force them against the shaft to more securely lock the wheel thereon. The hub portions 4 may be forced together to wedge against the cone 9 in any desirable manner—such, for instance, as providing a threaded portion near the end of the shaft and placing jam-nuts thereon, which will force the several wheel-hubs against each other in a manner to cause them to wedge tightly against their bearing-cones to lock them to the shaft. In Fig. 2 I have shown broken away the adjoining hub portion of a second bucket-wheel, and it will be noted that between the adjacent portions of the hubs spacer-rings or washers 11 may be inserted. I prefer to use a separate pair of feathers for each wheel, and I prefer to reduce the shaft 3 for each of the several wheels, though this is not essential, and all the wheels may be mounted upon a shaft of equal diameter throughout.

According to the present construction I am enabled to fix the wheel rigidly to the shaft by the employment of relatively light feathers, in view of the fact that a great part of the strain upon them will be assumed by the wedging action of the hub against the cone 9, it being only necessary to make the feathers sufficiently strong to stand the starting strain of the wheel.

Any desired number of rivets may be used to secure the wheel-sections together, and, if desired, a second row, such as 10ª, may be disposed near the hub for the purpose of forcing the wheel in engagement with the cone.

The peripheral flanges 5 of the wheel-sections flare outwardly and upwardly on an incline, terminating in parallel flanged portions 12, which are provided with inwardly-disposed overhanging peripheral shoulders 13. The flanges 5 are of sufficient width to accommodate the base-blocks for the two rows of peripheral buckets 14 and 15. It is an object of my invention to simplify and reduce the cost of manufacture of bucket-wheels of this character by providing what I term "double" base-blocks 16, each of which carries a bucket 14 and a bucket 15, formed integral therewith or secured thereto in any desired manner. The lower bearing edge of this double base-block 16 is wedge-shaped to conform with the angular divergence of the supporting-flanges 5 of the bucket-wheel, and, as will be noted in Fig. 5, the blocks are undercut on each side at 17. The overhanging flanges 13 of the bucket-wheel engage within these undercut portions 17 and securely lock the base-block against outward displacement. The base-block is also cut away at 18 between buckets 14 and 15 to leave clearance for the interposition of stationary intermediates. (Not here shown.)

I provide each of the buckets 14 and 15 with head-blocks 19 and 20, which abut against the head-blocks of adjacent buckets in their respective rows and form outer rims to restrict the fluid to the working passage of which the buckets form a part. Both the base and head blocks serve the purpose of spacing the buckets apart.

By mounting a bucket from each of the two rows upon a common base-block I secure a very simple construction which can be manufactured at much less expense than where it is attempted to form a plurality of buckets of the same row upon a common base-block. In the latter instance the difficulty of cutting out the body of metal between the overlapping buckets is most difficult and expensive, whereas in the present construction this disadvantage is entirely avoided and the bucket element complete may be readily machined without presenting any particular difficulty.

The wheel as constructed according to my invention possesses all desired strength and durability, may be readily assembled or taken apart, is much lighter in weight, and requires less metal to key or fasten it to the shaft than the usual wheels now in use.

Having thus described my invention, what I claim as new, and desire to secure by Letters Patent, is—

1. A turbine bucket-wheel, a shaft on which said wheel is mounted, a wedge between said wheel and shaft, and means to force said wheel into engagement with said wedge to cause it to grip the shaft for the purposes described.

2. A turbine bucket-wheel, a shaft-support therefor, and means to lock said wheel to said shaft comprising a wedge and a feather.

3. A turbine bucket-wheel, a shaft-support therefor, and means to lock said wheel to said shaft comprising a conical sleeve, a key, and a key-slot.

4. A turbine bucket-wheel, a hub, a shaft-support therefor, a conical sleeve between said hub and shaft, and means to force said hub and sleeve together to cause the latter to grip the shaft.

5. A turbine bucket-wheel, a hub, a shaft-support therefor, a conical sleeve between said hub and shaft, means to force said hub and sleeve together to cause the latter to grip the shaft, and means to positively lock said hub to said shaft.

6. A turbine bucket-wheel, a hub, a shaft-support therefor, a conical sleeve between said hub and shaft, means to force said hub and sleeve together to cause the latter to grip the shaft, and means to positively lock said hub and sleeve to said shaft.

7. A turbine bucket-wheel, a hub, a shaft-support therefor, and a segmental conical bearing for said hub, said bearing being adapted to grip said shaft when said hub is forced into engagement therewith.

8. A turbine bucket-wheel having a hub, a shaft-support therefor, a segmental conical bearing-sleeve between said hub and shaft, said sleeve being adapted to grip said shaft when forced into engagement with said hub, and means to lock said hub positively to said shaft.

9. A turbine bucket-wheel, a divided hub therefor, a shaft-support for said wheel, a conical bearing-sleeve disposed between the hub-sections and said shaft, and means to force one or both of said hub-sections against said sleeve to cause it to grip said shaft.

10. A turbine bucket-wheel, a hub therefor, a shaft-support for said wheel, a wedge between said hub and shaft, a wedging-surface in said hub adapted to engage said wedge, and means to force said hub against said wedge to cause it to grip the shaft.

11. A bucket-wheel having a two-part hub portion, a shaft, a conical bearing element for said hub portion mounted on said shaft, means to wedge the parts of said hub portion on said element, and means to lock said hub portion and element to said shaft.

12. A bucket-wheel comprising two sections, a hub-flange on each section, a portion of which engages a shaft, said flanges being constructed to leave a clearance between them and said shaft, and means interposed between said hub-flanges and shaft which are forced to grip said shaft when the hub-sections are forced together.

13. In combination with a bucket-wheel having a sectional hub, a shaft, a wedge-shaped element mounted on said shaft and engaging a section of said hub, means to force said section of the hub against said element to cause it to grip the shaft, and a key-and-slot means to lock said element and hub to the shaft.

14. In combination with a turbine bucket-wheel, a shaft on which said wheel is mounted, a sectional conical sleeve between said wheel and shaft, means to force said wheel into engagement with said sleeve to cause it to grip the shaft, a key-slot in said shaft, and a key disposed in said slot and between two sections of said sleeve and which also engages said wheel.

15. In combination with a turbine bucket-wheel, a shaft on which said wheel is mounted, a plurality of feathers which lock said wheel to said shaft, and segmental conical sleeves disposed between said feathers and engaging said shaft and wheel as and for the purposes described.

16. A turbine bucket-wheel comprising a plurality of disks, each disk having a hub portion, buckets secured to the outer periphery of the wheel, and means disposed between said hub portions and a supporting-shaft for said wheel, which act to wedge said wheel to the shaft when said hub portions are drawn or forced together.

17. A turbine bucket-wheel comprising two disks, each provided with oppositely-disposed hub-flanges, a supporting-shaft for said wheel, means to positively lock the outer ends of said flanges to said shaft, and a double wedge mounted on said shaft and engaging said flanges, said wedge being adapted to grip said shaft when said flanges are forced toward each other.

18. A turbine bucket-wheel comprising two disks, each provided with hub-flanges disposed in opposite directions and at an angle to the wheel-shaft, a segmental sleeve triangular in cross-section which is mounted on said shaft between said flanges and adapted to be forced into frictional engagement with said shaft when said disks are moved together, and means to positively lock said wheel to said shaft.

19. A turbine bucket-wheel comprising two disks formed with hub-flanges, a shaft, an annular shoulder at the outer end of each flange which engages said shaft, one or more key-slots in said shaft, slots in said shoulders registering with said key slot or slots, one or more keys to lock said wheel to said shaft, means to connect said wheel-disks together at or near their peripheries, a segmental sleeve adapted to be inserted between said hub-flanges and shaft before said disks are connected together.

20. In a turbine-wheel provided with a plurality of parallel rows of buckets, a bucket-supporting rim portion, base-blocks upon each of which one or more of the buckets of each row are mounted, and means to connect said base-blocks to the rim portion of said wheel.

21. In a turbine-wheel provided with a plurality of parallel rows of buckets, a plurality of bucket elements connected to said wheel, each of said elements comprising a bucket of each row formed integral with a common base.

22. In a turbine-wheel provided with two parallel rows of buckets, a plurality of double-bucket elements detachably connected thereto, each of said elements comprising a base portion and a bucket of each row integral therewith.

23. In a rotating element of a turbine having a peripheral bucket-supporting surface, buckets disposed in parallel rows around the bucket-supporting surface of said element, a bucket of each row having a common base portion, and means to connect said base portions to the bucket-supporting surface of said element.

24. In combination with a bucket-bearing element in a turbine, a plurality of bucket-supporting means connected to said element, a plurality of buckets mounted on each of said supporting means, said buckets being disposed in parallel rows and one or more of the buckets of each row being mounted on the same supporting means.

25. In combination with a turbine-wheel, a plurality of bucket elements mounted thereon, said elements comprising each a base and a plurality of buckets, the corresponding buckets of said elements forming parallel rows of buckets around said wheel.

26. In a turbine bucket-wheel, a rim provided with overhanging shoulder portions, a plurality of base-blocks which are engaged and retained by said shoulders, and two buckets mounted side by side on each base-block.

27. In a turbine bucket-wheel formed of two disks provided with rim-flanges, bucket elements retained in place between said flanges, each of said elements comprising a base and two buckets which respectively form parts of two parallel rows of buckets.

28. In combination with a turbine-wheel, a sectional rim the tread portions of which are disposed at an angle to each other, a compound bucket element having an angular bearing-face which corresponds with and rests upon said rim, and means to secure said element to said wheel.

29. A turbine-wheel having a V-shaped rim, a compound bucket element having a base portion with an angular bearing side seated on said rim, and means to secure said base to said rim.

30. A turbine-wheel formed of two disks, said disks having peripheral flanges which form the wheel-rim and are disposed at an obtuse angle to each other, base-blocks for buckets having angular bearing-faces which correspond with and rest upon said rim, and means to lock said base-blocks to said rim.

31. A bucket-wheel formed of two disks which have outwardly-flaring rim-flanges, a compound bucket element having a bearing-surface projecting on each side of the web of the wheel and adapted to seat on said flaring flanges and be held in position by them when said disks are drawn together in their operating position, and means to fasten said disks together.

32. A bucket element comprising two buckets and a common base integral therewith, a portion of said base being cut away between said buckets.

33. A bucket element comprising a base shouldered at each side of its top and an integral bucket mounted on each shoulder.

34. An integral bucket element comprising a base, a bucket on each side thereof, and a head-block on each bucket.

In witness whereof I have signed my name to this specification in the presence of two subscribing witnesses.

JAMES WILKINSON.

Witnesses:
R. D. JOHNSTON,
ROBT. D. JOHNSTON, Jr.